June 30, 1925. 1,544,418
F. F. BAHNSON
AUTOMATIC CONTROL FOR HUMIDIFIERS
Original Filed Aug. 13, 1918    2 Sheets-Sheet 1
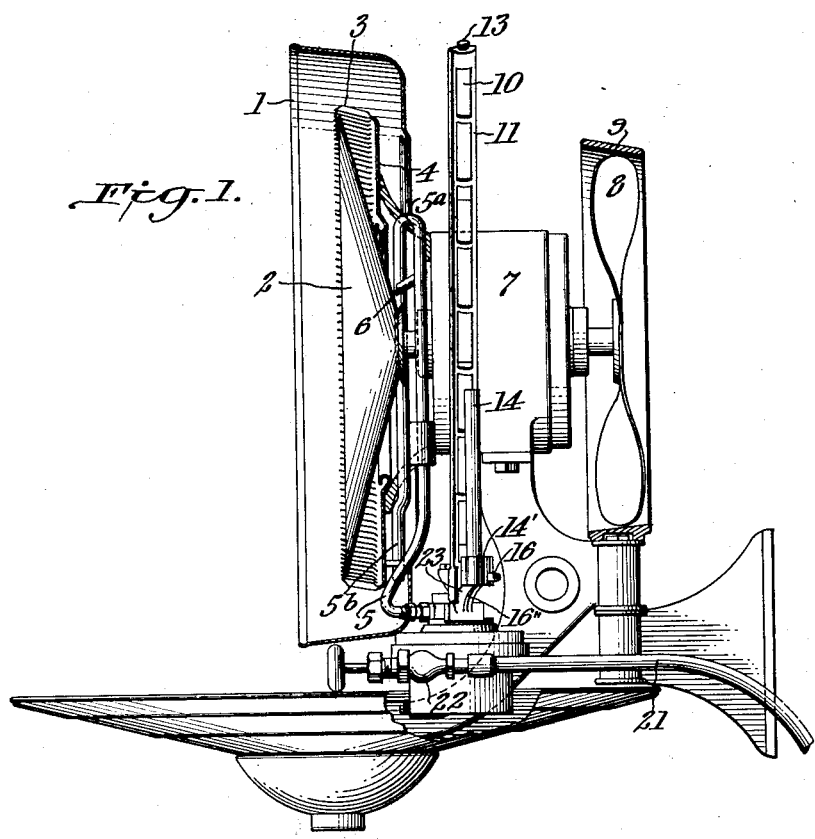

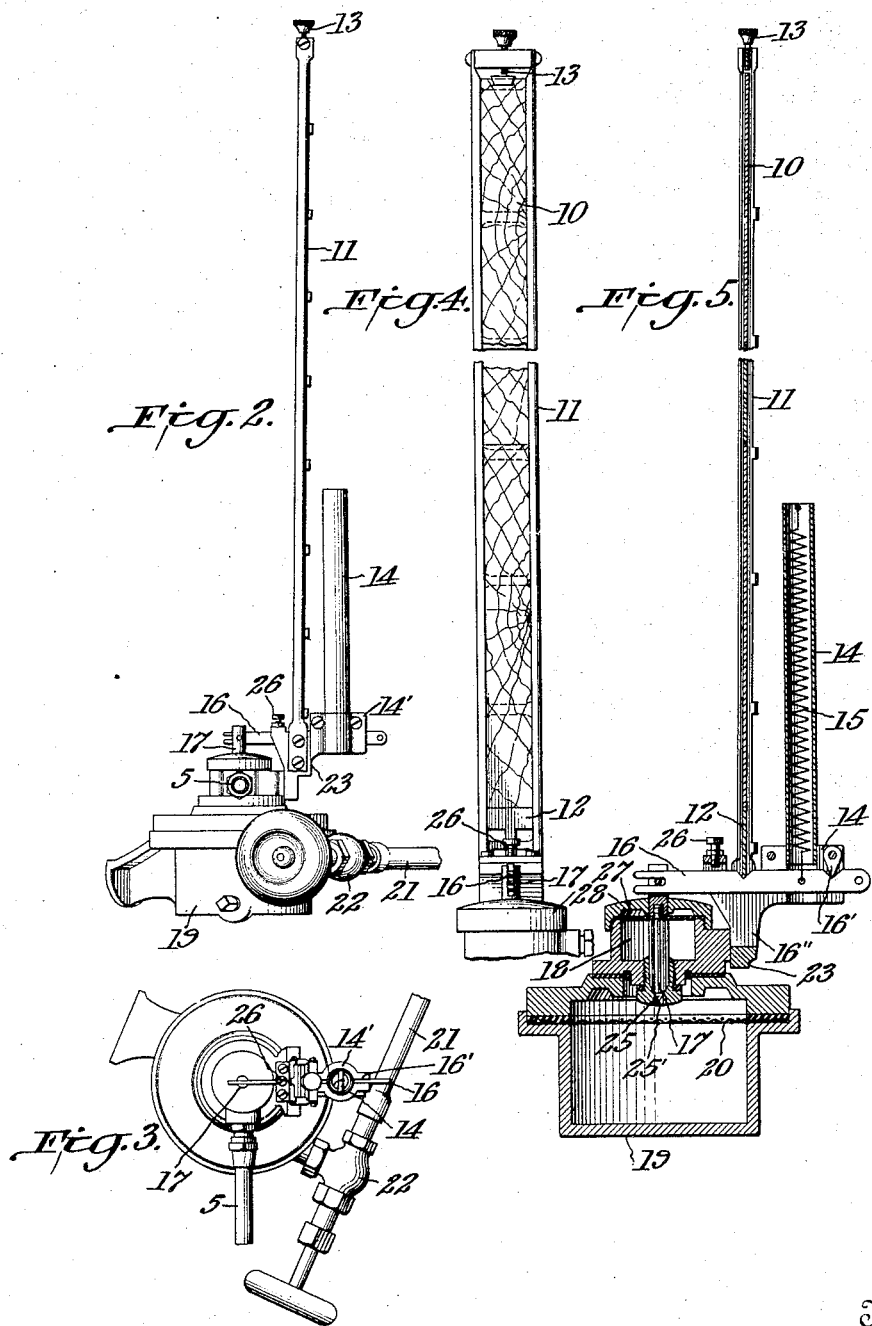

Patented June 30, 1925.

1,544,418

UNITED STATES PATENT OFFICE.

FREDERIC F. BAHNSON, OF WINSTON-SALEM, NORTH CAROLINA.

AUTOMATIC CONTROL FOR HUMIDIFIERS.

Original application filed August 13, 1918, Serial No. 249,697. Divided and this application filed September 11, 1922. Serial No. 587,632.

*To all whom it may concern:*

Be it known that I, FREDERIC F. BAHNSON, a citizen of the United States, residing at Winston-Salem, in the county of Forsyth and State of North Carolina, have invented certain new and useful Improvements in Automatic Control for Humidifiers, of which the following is a specification.

This invention relates to improvements in the automatic control of humidifiers so that the relative humidity of the air may be maintained at any desired point. Heretofore humidity regulation has been dependent on controlling devices which afford practically no intermediate steps between full operation of the humidifiers and entire stoppage of their evaporative effort. It is obvious that the effect of such control would inevitable be such as to cause a "saw tooth" record on a recording hygrometer.

It is the particular object of this invention to provide controlling means actuated by the relative humidity of the air, whereby the evaporative effort of a humidifier is automatically varied in amount in proportion to the requirements to be met. The desired result is accomplished by using a valve with a variable opening, the amplitude of such opening being controlled positively and directly by the effect of the moisture content of the air on a specially designed hygrometric strip.

This control is peculiarly adaptable to humidifiers of the type disclosed in my Patent #1,267,166, and while that type is used in this disclosure for illustration, I do not limit myself to that particular application, as this control may be applied to any humidifying device whose humidifying action is proportional to the water supplied to it.

It will be understood that I do not limit myself to the exact materials specified herein for the various parts of this device, and that mechanical changes dictated by ease of manufactnre or efficient operation may be made without departing from the spirit and scope of the invention.

That the construction and operation of the device may be understood, reference is had to the accompanying drawings in which the same reference numbers always indicate the same parts.

Figure 1 is a general view of the invention as applied to a humidifier of the type disclosed in my Patent 1,267,166.

Figure 2 is an elevation of the control alone.

Figure 3 is a plan view of the control.

Figure 4 is an elevation of the hygrometric strip.

Figure 5 is a section showing the principal parts of the control.

In the drawings 1 is a sheet metal case or guiding means for air currents produced by fan 8, 2 is a revolving disc to which near its center, water is supplied, and from which the water is thrown by centrifugal force against the annular row of obstructions 3, these obstructions being supported by and integral with ring 4. Motor 7 is used to rotate fan 8 and disc 2. Fan guard 9 protects the fan and assists in guiding the air currents.

The chief parts of the control are strip 10, lever 16 of which is held in position upon a fulcrum 16' by spring 15 in spring case 14, which in turn is held in a clamp 14' and valve 25 operated by lever 16 through valve stem 17 in any suitable manner.

10 is a long thin strip made preferably of one or more pieces sawed across the grain from the end of a board of specially selected wood. By selection of wood to get substantially radial section I obtain a large total change of length in the strip for varying relative humidities. Other material than wood may be used, and in special applications the strip may be made of the same material as that worked in the room whose humidity it is desired to control.

Accuracy of control is accomplished by proper selection of material for strip 10, the degree of sensitiveness being determined by the length of strip 10. In practice I use a strip less than 1% of whose total available change of length will move valve 25 from tight closure to full opening. It will be noted that lever 16 is so proportioned and arranged that any motion of strip 10 is multiplied on valve stem 17. As shown, the motion of valve stem 17 is about double that of strip 10, but this ratio may be changed as desired.

The action of the control is as follows:

Water is admitted from any convenient source through pipe 21 and hand operated valve 22 to chamber 19 in which is located strainer 20. When strip 10 is dry from low humidity, valve 25 is open, the water passes to chamber 18 from which it is conducted through pipe 5 and nipple 6 to disc 2. The opening from pipe 5 to nipple 6 is of such size that the flow of water to the humidifier (disc 2 in this disclosure) can never exceed the maximum amount required for efficient action. For the reason to be immediately stated, the valve opening 25, however, is made larger than the opening leading from pipe 5 to nipple 6. Ordinarily the range of motion of the valve stem 17 is limited by set screw 26 so that the largest effective valve opening is substantially the same as the opening between pipe 5 and nipple 6. At times, however, it is advisable to open the valve 25 wide and allow an excess of water to pass into pipe 5 which water will fill the pipe 5 completely and pass out through the free end 5ᵇ of the pipe 5. This pipe 5 having the shape of an inverted U acts as a siphon so that no water will pass through the nipple 6 to the disk 2, but that rather air will be sucked in through the nipple 6 clearing it of trash or other obstructions that may settle therein.

It is understood that the opening between pipe 5 and nipple 6 may be made slightly larger than required for the efficient operation of the humidifier. In this case the siphon arrangement acts as a safety device to prevent flooding of the humidifier until the set screw 26 is set to properly limit the opening of the valve.

Strip 10 is free to move longitudinally in guides 11, except as limited by adjusting screw 13 and block 12 or other suitable mechanism. As the relative humidity of the air increases, strip 10 absorbs moisture, and expands, forcing down block 12, lever 16, valve stem 17, closing valve 25. I have found by experiment that strip 10 soon assumes such a condition that valve 25 has a practically constant opening, just enough water being permitted to reach disc 2 to hold the relative humidity of the room at the desired point. In other words, with constant conditions, valve 25 is automatically held at the proper degree of opening to supply to disc 2 just enough water so that the evaporation of water by the humidifier exactly compensates for the removal of moisture from the air in the room by leakage through walls or openings or by absorption of such water by dry materials. The construction of strip 10 is such that changes of air condition readily and quickly cause change in its length. This makes my control very quick acting.

It should be noted that the valve defines a steep cone and that the valve seat is correspondingly sharp-angled. While the range of movement of the valve stem between fully open and fully closed position is made short so as to obtain a quick control for a particular point of humidity, the change of the effective opening is nevertheless very gradual throughout the range of movement. It thus can be readily seen that the arrangement accomplishes an accurately graduated variation in the flow of water within a very small range of motion of the hygrometrically responsive element and consequently within a very small range of variations of the relative humidity.

To avoid packing friction on the valve stem, I make valve stem 17 in two pieces, which, when screwed together, clamp between them the center of flexible diaphragm 27, which is held at its outer edge by cap 28. This construction permits freedom of movement by valve stem 17 along its axis, keeping it centered in the valve, and at the same time chamber 18 is rendered water tight.

Adjusting screw 13 is provided to permit setting the control for any relative humidity desired by changing the distance through which strip 10 must expand in order to close valve 25.

Should the relative humidity fall very low, strip 10 simply contracts, and remains loose in guides 11. If the relative humidity rises beyond the point at which strip 10 closes valve 25, further expansion of strip 10 simply pushes down lever 16 against the tension of spring 15, away from fulcrum 16', into a space provided for such movement by a deep slot 16" in supporting block 23.

If it is desired to flush out valve 25, chamber 18, pipe 5 and nipple 6, the end of lever 16 opposite the valve stem is pulled down. The attachment of spring 15 thus becomes the fulcrum, the other end of lever 16 rises, and with it valve stem 17, opening valve 25 to the limit imposed by diaphragm 27 striking the central shoulder of cap 28. With this wide opening of valve 25 the siphon effect is produced as described above.

It will be noted from Figure 1 which shows the preferred position of the control that the air which affects strip 10 is that from the room itself, and not air which is charged with moisture from the humidifier. The control should always be so placed whether on my humidifier or any other, or mounted at a distance, that it is surrounded by air in the condition of the average of the room and since the accuracy of any hygrometer is dependent upon active circulation of air over or around it, this control should, wherever fans are in operation, be placed in the air current produced by such fans.

It is understood that the expansive movement of the hygrometric strip or strips may be magnified to a greater extent than shown and the valve so designed as to change the valve opening very gradually so that the sensitiveness of the hygrometric control may be increased to any desired degree.

Experimental tests of the invention, as above described, through a period of months show that this control gives a remarkably smooth and uniform record on a recording hygrometer placed in the room controlled by my invention.

Various changes may be made within the scope of the invention.

This application is a division of my application Ser. No. 249,697 filed Aug. 13, 1918, now Patent 1,439,217 granted December 19, 1922.

I claim:

1. In a humidifier, the combination with a conduit and valve mechanism for controlling the same, of a hygrometrically responsive element mounted to expand in one direction, a lever bodily movable in the plane of movement of the said element and disposed to be acted upon intermediate its ends by the element, means disposed near one end of the lever for limiting the movement thereof toward the said element, resilient means for drawing the lever against said limiting means and means connected with the other end of the lever for translating motion thereof to the valve mechanism.

2. Apparatus according to claim 1 in which the limiting means has a pivot edge and the lever has a notch receiving the edge.

3. Apparatus according to claim 1 in which the means for translating the motion of the hygrometrically responsive element includes a member mounted for reciprocating movement and a loose pivotal connection between the lever and the said member.

4. Apparatus according to claim 1 in which the means for translating the motion of the hygrometrically responsive element includes a member mounted for reciprocating movement, means for limiting the movement of the said member and a loose pivotal connection between the lever and said member.

5. Apparatus according to claim 1 in which the means for translating the motion of the hygrometrically responsive element includes a member mounted for reciprocating movement, means for limiting the angular movement of the lever in the direction toward the hygrometric element and a loose connection between the lever and the said member.

6. Apparatus according to claim 1 including a guide in which the hygrometrically responsive element is freely movable and means for adjustably limiting the movement of the said element in a direction away from said lever.

7. In a humidifier, the combination with a conduit and valve mechanism constructed and arranged to have a relatively short movement between fully open and fully closed position, of a hygrometric strip having a high rate of expansive movement and means for translating the movement of said strip to the valve mechanism, said means including resilient means adapted to yield to the expansive movement of the hygrometric strip when the valve has reached closing position.

8. In a humidifier, the combination of a conduit, valve mechanism having a relatively short movement between fully open and fully closed position, but constructed to gradually vary the effective opening within its range of movement, a hygrometric strip having a high rate of expansive movement, means for translating the movement of the said strip to the valve mechanism and means for adjusting the said strip relatively to the translating means.

9. Apparatus according to claim 8 in which the translating mechanism includes resilient means adapted to yield to the expansive movement of said strip when the valve has reached closing position.

In testimony whereof, I affix my signature.

FREDERIC F. BAHNSON.